Sept. 1, 1970  R. L. TUCKER  3,526,703
MEANS FOR QUICK AND EASY MOUNTING OF AN ELECTRICAL
ACCESSORY WITHIN AN OUTLET BOX
Filed March 10, 1969
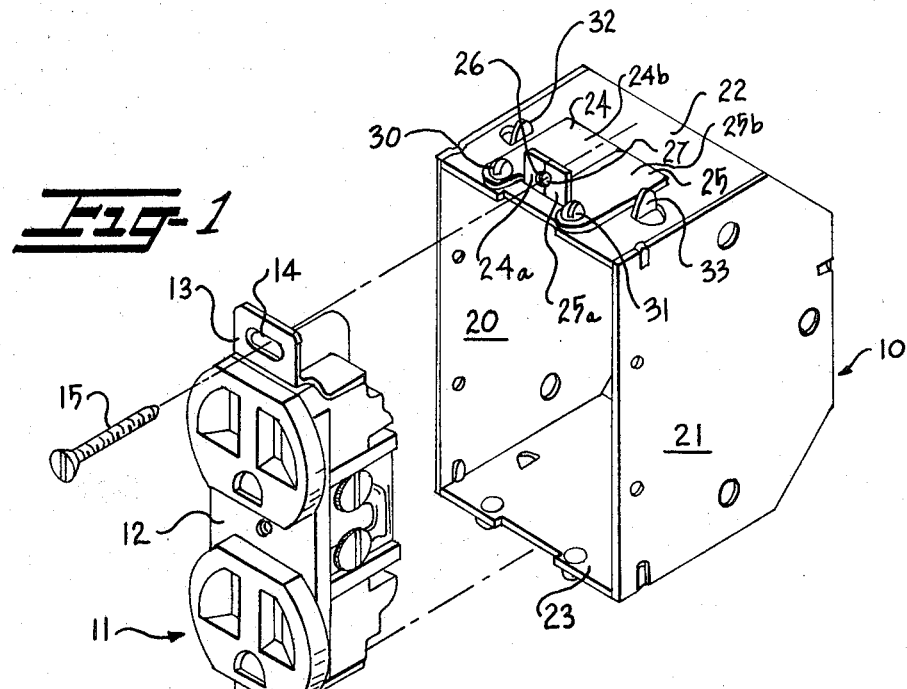
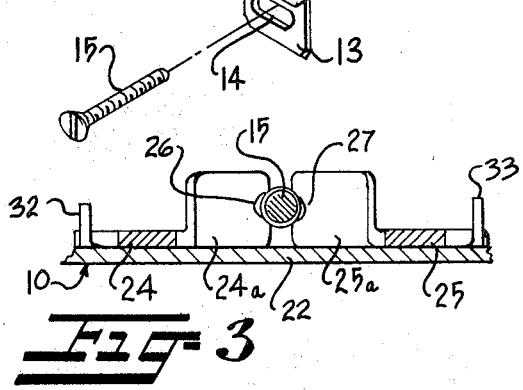
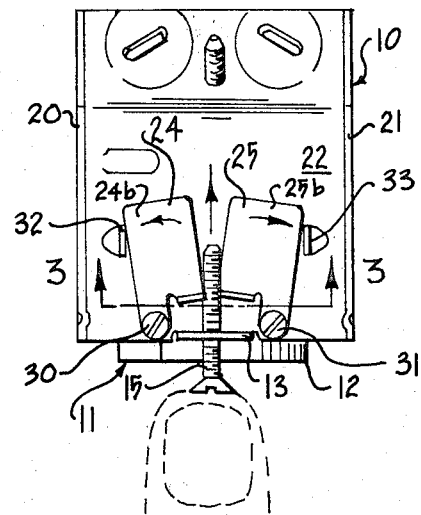
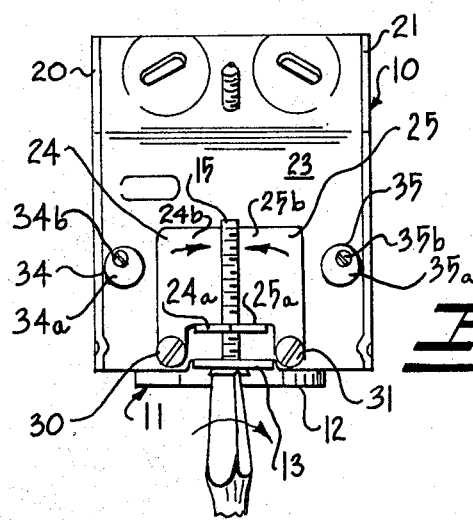
INVENTOR:
ROBERT L. TUCKER
BY Parrott, Bell, Seltzer, Park & Gibson
ATTORNEYS United States Patent Office 3,526,703
Patented Sept. 1, 1970

3,526,703
MEANS FOR QUICK AND EASY MOUNTING OF AN ELECTRICAL ACCESSORY WITHIN AN OUTLET BOX
Robert L. Tucker, Rte. 3, Rome, Ga. 30161
Filed Mar. 10, 1969, Ser. No. 805,577
Int. Cl. H02g 3/08
U.S. Cl. 174—53            7 Claims

ABSTRACT OF THE DISCLOSURE

Means for permitting the quick and easy mounting of an accessory within an outlet box including a pair of side-by-side mounting lugs mounted for pivotal movement on each of two opposing portions of the outlet box and extending outwardly therefrom, each lug having an internally threaded concavity in the side thereof adjacent the other lug with said concavities cooperating to define internally threaded openings through each pair of said mounting lugs adapted to threadably receive therein screws connected to the accessory, and the lugs being movable away from each other upon a screw being pushed through the opening defined therebetween to permit the quick and easy insertion thereinto of a screw substantially to the fully inserted position and toward each other upon rotation of the screw in a clockwise direction to permit tightening of the screw and secure locking of the accessory within said outlet box.

---

This invention relates to an outlet box adapted to receive and support therewithin an electrical accessory, such as a receptacle, switch and the like, and more particularly to means for permitting the quick and easy mounting of an electrical accessory within an outlet box while securely locking the accessory therewithin.

As is well known, electrical accessories, such as receptacles, switches and the like, are conventionally mounted in outlet boxes with screws carried by the accessory threaded into threaded openings in mounting lugs provided on opposed portions of the outlet box. In order to securely lock the accessory within the outlet box, the screws are usually of considerable length and must be screwed into the mounting lugs for a major portion of their length before they are tightened and the accessory securely locked in place. Accordingly, considerable time has been consumed heretofore in threading the screws into the mounting lugs on the outlet box.

In an effort to reduce the time and effort required for the mounting of an electrical accessory within an outlet box, numerous attempts have been made, most of which have included spring-acting means acting in cooperation with the accessory and outlet box for quick and easy mounting. However, these and other means heretofore provided have proven to be unsatisfactory for one or more reasons including the requirement of specially constructed accessories and outlet boxes for receiving the particular accessory and the danger that the accessory might not remain securely locked within the outlet box.

With the aforementioned in mind, it is an object of this invention to provide a means for the quick and easy mounting of an electrical accessory within an outlet box while securely locking the accessory therewithin and which does not require specially constructed electrical accessories.

The objects of this invention are accomplished by providing in combination with an outlet box adapted to receive and support therewithin an electrical accesory, such as a receptacle, switch and the like, means mounting said accessory within the outlet box comprising a pair of side-by-side mounting lugs carried by each of two opposing portions of said outlet box and extending outwardly therefrom, each lug having an internally threaded concavity in the side thereof adjacent the other lug, said concavities cooperating to define internally threaded openings through said pair of mounting lugs adapted to threadably receive therewithin screws connected to the accessory to be supported in the outlet box, and means mounting said lugs of each of said pairs on said outlet box for movement away from each other upon a screw being pushed through the opening defined therebetween to permit the quick and easy insertion thereinto of a screw substantially to the fully inserted position and toward each other upon rotation of the screw in a clockwise direction to permit tightening of the screw and secure locking of the accessory in position in said outlet box.

Some of the objects of the invention having been stated, other objects will appear as the description proceeds, when taken in connection with the accompanying drawings, in which—

FIG. 1 is an exploded perspective view of an electrical accessory and an outlet box constructed in accordance with the present invention for permitting the quick and easy mounting of the accessory within the outlet box while securely locking the accessory therewithin;

FIG. 2 is a top plan view showing the quick and easy insertion of a screw carried by the accessory into the mounting means of the present invention;

FIG. 3 is a sectional view taken substantially along lines 3—3 of FIG. 2; and

FIG. 4 is a bottom plan view showing the tightening or clockwise rotation of the screw to securely lock the accessory within the outlet box and includes a modified form of abutment means limiting the pivotal movement of the mounting lugs away from each other.

Referring more specifically to the drawings wherein like numerals have been used where possible to indicate like parts, there is illustrated in FIG. 1 an outlet box 10 adapted to receive and support therewithin an electrical accessory 11, such as a receptacle, switch and the like. The accessory 11 is illustrated as a receptacle which is of conventional construction and includes a housing 12 of plastic or the like insulating material and tabs 13 disposed on opposed portions of the housing 12. Tabs 13 extend outwardly from housing 12 in a common plane and in opposed relation and include elongated apertures 14 for receiving screws 15 with the head portions thereof being engageable with tabs 13.

Outlet box 10 is preferably of conventional construction in that it comprises opposed parallel side walls 20, 21 and opposed parallel top and bottom walls 22, 23, the distance between the top and bottom walls being less than the distance between opposed apertures 14 of tabs 13 whereby when the receptacle 11 is received in the outlet box 10, the screws 15 will be positioned outwardly of top and bottom walls 22, 23.

Mounted on opposed top and bottom walls 22, 23, are means for permitting the quick and easy mounting of the receptacle 11 within the outlet box 10 in accordance with the present invention. In describing these means, only that mounted on wall 22 will be described, since wall 23 is equipped with substantially identical means. The means comprises a pair of mounting lugs 24, 25 carried by wall 22 and lugs 24, 25 have side-by-side portions 24a, 25a extending outwardly from and generally perpendicular to wall 22. Each lug portion 24a, 25a has an internally threaded concavity 26, 27 in the side thereof adjacent the other lug portion, with the concavities 26, 27 cooperating to define an internally threaded opening through the pair of mounting lugs 24, 25 for threadably receiving therein the threaded portion of screw 15.

Also, each of the lugs 24, 25 is mounted by screws 30, 31 for pivotal movement about spaced axes which are spaced to opposite sides of the side-by-side lug portions 24a, 25a. Preferably, screws 30, 31 are also spaced forwardly of lug portions 24a, 25a. The pivotal movement of the lugs 24, 25 is limited by abutment stops 32, 33 carried by wall 22 of outlet box 10 and disposed in spaced apart relation outwardly of horizontal portions 24b, 25b of lugs 24, 25, respectively, and in the path of pivotal movement of the lugs. This limit upon the pivotal movement of the side-by-side lug portions 24a, 25a away from each other upon a screw being pushed through the opening defined therebetween permits the quick and easy insertion thereinto of the screw substantially to the fully inserted position and insures threading engagement with the screw. This threading engagement insures pivotal movement of the lug portions 24a, 25a toward each other upon rotation of the screw in a clock-wise direction to permit tightening of the screw and secure locking of the receptacle 11 into position within the outlet box 10.

The abutment stops 32, 33, illustrated in FIGS. 1–3, have been formed by portions cut and deflected outwardly from the wall 22. As is readily apparent, the abutment stops may be formed in any other suitable manner. In FIG. 4, modified abutment stops 34, 35 have been illustrated and comprise eccentric portions 34a, 35a mounted on wall 23 by screws 34b, 35b. By suitable rotation of these stops 34, 35 the pivotal movement of the lugs 24, 25 away from each other may be varied whereby screws of varying sizes may be threadably received in the opening defined between the side-by-side portions 24a, 25a, and upon clockwise rotation of the screw will pivot the lugs 24, 25 toward each other to permit tightening of the screw and secure locking of the receptacle 11 in position in the outlet box 10.

It is readily apparent that the receptacle 11 may be quickly and easily mounted within the outlet box 10 by positioning the receptacle 11 within the outlet box 10 with opposed tabs 13 extending outwardly beyond the opposed walls 22, 23 and with the apertures 14 aligned with the threaded openings defined between lug portions 24a, 25a of each pair of lugs 24, 25 on opposed walls 22, 23. Screws 15 are inserted in apertures 14 and pushed through the internally threaded openings to substantially the fully inserted position, as best shown in FIG. 2, and then rotated in a clock-wise direction as best shown in FIG. 4, to pivot the lugs 24, 25 toward each other to tighten the screw and securely lock the receptacle 11 within the outlet box 10. With the screws 15 substantially inserted by pushing them through the internally threaded openings, the screws will only need to be rotated in the clockwise direction a few revolutions to securely lock the receptacle 11 within the outlet box 10 and thus, the time and effort consumed in installation of the receptacle 11 will be substantially decreased. It will be observed that in order to remove the receptacle 11 from the outlet box 10, it is necessary to de-thread the screws 15 by rotation in a counter-clockwise direction throughout the length which is received by the threaded openings, and accordingly, this insures that the receptacle 11 will remain securely locked within the outlet box 10.

In the drawings and specification there have been set forth preferred embodiments of the present invention, and although specific terms are employed, they are used in a generic and descriptive sense only and not for purposes of limitation, the scope of the invention being defined in the claims.

I claim:

1. In an outlet box adapted to receive and support therewithin an electrical accessory, such as a receptacle, switch and the like, the combination therewith of means for permitting the quick and easy mounting of an accessory within the outlet box while securely locking the accessory therewithin, said means comprising a pair of side-by-side mounting lugs carried by each of two opposing portions of said outlet box and extending outwardly therefrom, each lug having an internally threaded concavity in the side thereof adjacent the other lug, said concavities cooperating to define internally threaded openings through said pair of mounting lugs which openings are adapted to threadably receive therewithin screws connected to the accessory to be supported in the outlet box, and means mounting said lugs of each pair on said outlet box for movement away from each other upon a screw being pushed through the opening defined therebetween to permit the quick and easy insertion thereinto of a screw substantially to the fully inserted position and for movement toward each other upon rotation of the screw in a clock-wise direction to permit tightening of the screw and secure locking of the accessory in position in said outlet box.

2. The combination of claim 1 wherein said lugs of each of said pairs are mounted for pivotal movement about spaced axes, and including means limiting the pivotal movement of said lugs of each of said pairs away from each other upon a screw being pushed through the opening defined therebetween to insure that the lugs remain in engagement with the screw to permit tightening of the screw and secure locking of the accessory in position in said outlet box.

3. The combination of claim 2 wherein said means limiting the pivotal movement of said lugs of each of said pairs comprises abutment means carried by said outlet box in spaced apart relation outwardly of each of said side-by-side lugs and disposed in the path of pivotal movement of said lugs so as to limit the pivotal movement of said lugs of each of said pairs.

4. The combination of claim 3 wherein said abutment means comprise portions of said outlet box deflected outwardly into the path of pivotal movement of said lugs.

5. The combination of claim 3 wherein said abutment means are adjustable to vary the allowable pivotal movement of said lugs of each of said pairs away from each other whereby screws of varying size may be threadably received in the opening defined between said lugs of each of said pairs.

6. The combination of claim 3 wherein at least one of said abutment means for each pair of mounting lugs includes an eccentric abutment portion rotatably mounted on said outlet box to vary the allowable pivotal movement of said lugs of each of said pairs away from each other to threadably receive screws of varying size in the opening defined therebetween.

7. In an outlet box adapted to receive and support therewithin an electrical accessory, such as a receptacle, switch and the like, and having an open front end, the combination therewith of means for permitting the quick and easy mounting of an accessory therewithin, said means comprising a pair of side-by-side mounting lugs carried by each of two opposing portions of said outlet box and each of said lugs comprising a first portion extending parallel to said opposing portions of said outlet box and a second portion extending perpendicular to and outwardly from said first lug portion, each second lug portion having an internally threaded concavity in the side thereof adjacent the other second lug portion, said concavities cooperating to define internally threaded openings through said pair of mounting lugs adapted to threadably receive therein screws connected to the accessory to be supported in the outlet box, means mounting said first lug portions of each of said pairs on said outlet box for pivotal movement about spaced axes which are spaced forwardly of and to opposite sides of said second lug portions, and abutment means carried by said outlet box in spaced apart relation outwardly of said first lug portions of each of said pairs of lugs and disposed in the path of pivotal movement of said lugs to limit the pivotal movement of said lugs away from each other upon a screw being pushed through the opening defined between said second lug portions to permit the quick and easy insertion thereinto of a screw substantially to the fully inserted position and to permit tightening of the screw and secure locking of the accessory in position in said outlet box.

References Cited

UNITED STATES PATENTS 2,455,889  12/1948  Despard _____ 174—53

ELLIOT A. GOLDBERG, Primary Examiner

D. A. TONE, Assistant Examiner

220—3.2